(12) United States Patent
Ohashi

(10) Patent No.: US 11,081,997 B2
(45) Date of Patent: Aug. 3, 2021

(54) POWER CONVERSION DEVICE, MOTOR DRIVE UNIT, AND ELECTRIC POWER STEERING DEVICE

(71) Applicant: Nidec Corporation, Kyoto (JP)

(72) Inventor: Hiromitsu Ohashi, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 166 days.

(21) Appl. No.: 16/461,845

(22) PCT Filed: Dec. 26, 2017

(86) PCT No.: PCT/JP2017/046507
§ 371 (c)(1),
(2) Date: May 17, 2019

(87) PCT Pub. No.: WO2018/135248
PCT Pub. Date: Jul. 26, 2018

(65) Prior Publication Data
US 2019/0372502 A1 Dec. 5, 2019

(30) Foreign Application Priority Data

Jan. 20, 2017 (JP) .............................. JP2017-008405

(51) Int. Cl.
*H02P 27/08* (2006.01)
*B62D 5/04* (2006.01)
*H02M 7/5387* (2007.01)

(52) U.S. Cl.
CPC ............ *H02P 27/08* (2013.01); *B62D 5/0403* (2013.01); *B62D 5/0463* (2013.01); *H02M 7/53871* (2013.01)

(58) Field of Classification Search
CPC ....... H02P 27/08; H02P 25/22; B62D 5/0403; B62D 5/0463; H02M 7/53871
See application file for complete search history.

(56) References Cited

U.S. PATENT DOCUMENTS

2016/0134212 A1* 5/2016 Kikuchi ............... H02H 7/1225
                                                              318/400.21
2017/0237377 A1* 8/2017 Furukawa ............... H02P 29/00
                                                              318/564

FOREIGN PATENT DOCUMENTS

| JP | 2014-128156 A | 7/2014 |
| JP | 2014-192950 A | 10/2014 |
| JP | 2014192950 | * 10/2014 |

OTHER PUBLICATIONS

Translation of JP2014192950 has been attached.*
Official Communication issued in International Patent Application No. PCT/JP2017/046507, dated Apr. 17, 2018.

* cited by examiner

*Primary Examiner* — Zoheb S Imtiaz
(74) *Attorney, Agent, or Firm* — Keating & Bennett

(57) ABSTRACT

A power conversion device includes a first inverter connected to first ends of windings of each phase of a motor, a second inverter connected to second ends of the windings of each phase, a first phase separation relay circuit to switch between connection and disconnection between the first ends of the windings of each phase and the first inverter, a second phase separation relay circuit to switch between connection and disconnection between the second ends of the windings of each phase and the second inverter, a sub-inverter circuit connectable to the first ends and the second ends of the windings of each phase, a third phase separation relay circuit to switch between connection and disconnection between the first ends of the windings of each phase and the sub-inverter circuit, and a fourth phase separation relay circuit to switch between connection and disconnection between the second ends of the windings of each phase and the sub-inverter circuit.

19 Claims, 9 Drawing Sheets

POWER CONVERSION DEVICE, MOTOR DRIVE UNIT, AND ELECTRIC POWER STEERING DEVICE

CROSS REFERENCE TO RELATED APPLICATIONS

This is the U.S. national stage of application No. PCT/JP2017/046507, filed on Dec. 26, 2017, and priority under 35 U.S.C. § 119(a) and 35 U.S.C. § 365(b) is claimed from Japanese Application No. 2017-008405, filed Jan. 20, 2017; the entire contents of which are incorporated herein by reference.

FIELD OF THE INVENTION

The present disclosure relates to a power conversion device, a motor drive unit, and an electric power steering device.

BACKGROUND

Electric motors such as brushless direct current (DC) motors and alternating current (AC) synchronous motors (hereinafter simply referred to as "motors") are generally driven by a three-phase current. Complex control techniques such as vector control are used to accurately control a three-phase current waveform. Such control techniques require a high degree of mathematical operation, and a digital operation circuit such as a microcontroller (microcomputer) is used. Vector control technology is utilized in fields where motor load variation is large, e.g., washing machines, electrically-assisted bicycles, electric scooters, electric power steering devices, electric vehicles, industrial equipment, and the like. Meanwhile, for a motor with a relatively small output, a different motor control method, such as a pulse width modulation (PWM) method, is adopted.

In the in-vehicle field, an electrical control unit (ECU) for automobiles is used for a vehicle. The ECU includes a microcontroller, a power supply, an input/output circuit, an analog-digital (AD) convertor, a load drive circuit, a read only memory (ROM), and the like. An electronic control system is built around the ECU. For example, the ECU processes a signal from a sensor to control an actuator such as a motor. Specifically, the ECU controls an inverter in a power conversion device while monitoring a rotational speed or torque of a motor. Under control of the ECU, the power conversion device converts drive power supplied to the motor.

In recent years, a mechanically and electrically integrated motor in which a motor, a power conversion device, and an ECU are integrated has been developed. Particularly, in the in-vehicle field, high quality assurance is required from the viewpoint of safety. For that reason, a redundant design has been adopted in which a safe operation can be continued even in the case in which a part of a component fails. As an example of redundant design, providing two power conversion devices for a single motor has been taken into consideration. As another example, providing a backup microcontroller in a main microcontroller has been taken into consideration.

For example, in a power conversion device that includes a controller and two inverters and converts power supplied to a three-phase motor, as a related art, each of the two inverters is connected to a power supply and a ground (hereinafter referred to as "GND"). One inverter is connected to first ends of three-phase windings of the motor, and the other inverter is connected to the second ends of the three-phase windings. Each inverter includes a bridge circuit formed of three legs, each of which includes a high side switching element and a low side switching element. In the case in which a failure of a switching element in the two inverters is detected, the controller switches motor control from control at a normal time to control at an abnormal time. In the present specification, "abnormal" mainly means a failure of a switching element. Also, "control at a normal time" means control in a state in which all of the switching elements are normal, and "control at an abnormal time" means control in a state in which a failure has occurred in a certain switching element.

In the control at the abnormal time, in an inverter including a failed switching element (hereinafter referred to as a "failed inverter") of the two inverters, a neutral point of windings is configured by turning the switching elements on or off according to a predetermined rule. According to the rule, for example, in the case of an open failure in which a high side switching element is turned off at all times, in the bridge circuit of the inverter, switching elements other than the failed switching element are turned off among the three high side switching elements, and the three low side switching elements are turned on. In that case, the neural point is configured on the low side. Alternatively, in the case of a short failure in which a high side switching element is turned on at all times, in the bridge circuit of the inverter, switching elements other than the failed switching element are turned on among the three high side switching elements, and the three low side switching elements are turned off. In that case, the neutral point is configured on the high side. According to the power conversion device of the related art, at the abnormal time, the neutral point of the three-phase windings is configured in a failed inverter. Even when a failure occurs in a switching element, motor driving can be continued using a normal inverter.

SUMMARY

In the above-described related art, further improvement of motor output in control at an abnormal time is in demand.

A power conversion device according to an example embodiment of the present disclosure is a power conversion device that converts power from a power supply to power supplied to a motor having n-phase (n is an integer of 3 or more) windings, the power conversion device including a first inverter connected to first ends of the windings of each phase of the motor, a second inverter connected to second ends of the windings of each phase, a first phase separation relay circuit to switch between connection and disconnection between the first ends of the windings of each phase and the first inverter, a second phase separation relay circuit to switch between connection and disconnection between the second ends of the windings of each phase and the second inverter, a sub-inverter circuit connectable to the first ends and the second ends of the windings of each phase, a third phase separation relay circuit to switch between connection and disconnection between the first ends of the windings of each phase and the sub-inverter circuit, and a fourth phase separation relay circuit to switch between connection and disconnection between the second ends of the windings of each phase and the sub-inverter circuit.

A power conversion device according to an example embodiment of the present disclosure is a power conversion device that converts power from a power supply to power supplied to a motor having n-phase (n is an integer of 3 or more) windings, the power conversion device including a first inverter connected to first ends of the windings of each phase of the motor, a second inverter connected to second ends of the windings of each phase, a first phase separation relay circuit to switch between connection and disconnection between the first ends of the windings of each phase and the first inverter, a sub-inverter circuit connectable to the first ends of the windings of each phase, and a second phase separation relay circuit to switch between connection and disconnection between the first ends of the windings of each phase and the sub inverter circuit.

The above and other elements, features, steps, characteristics and advantages of the present disclosure will become more apparent from the following detailed description of the example embodiments with reference to the attached drawings.

DETAILED DESCRIPTION

Before describing example embodiments of the present disclosure, the knowledge of the inventor of the present application on which the present disclosure is based will be described.

Figure 1A:
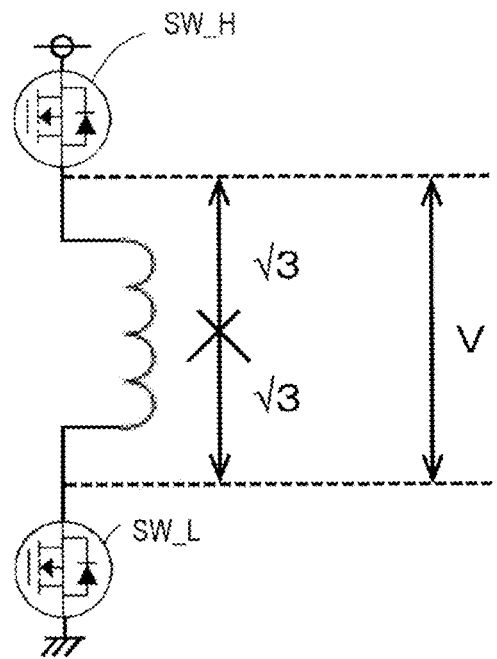
FIG. 1A is a schematic diagram illustrating a condition in which a motor voltage V is applied to a winding of one phase in control at a normal time.
Figure 1B:
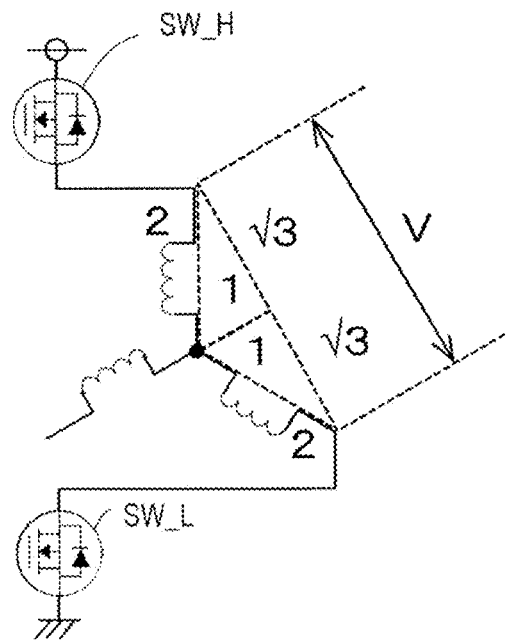
FIG. 1B is a schematic diagram illustrating a condition in which a motor voltage V is applied to star-connected three-phase windings in control at an abnormal time.

FIG. 1A schematically illustrates a condition in which a motor voltage V is applied to a winding of one phase in control at a normal time. FIG. 1B schematically illustrates a condition in which a motor voltage V is applied to star-connected three-phase windings in control at an abnormal time.

In the power conversion device of the related art, applying a voltage V to a motor is taken into consideration. A mode of control at a normal time in the related art includes first to third control modes. Further, the third control mode corresponds to three-phase energization control of the present disclosure which will be described below. In the third control mode, as illustrated in FIG. 1A, the voltage V is applied as it is to a winding of one phase. On the other hand, in control at an abnormal time, three-phase windings are star-connected, and a node of the star connection functions as a neutral point. Three-phase windings aligned at intervals of 120° around the node are taken into consideration. In that case, as illustrated in FIG. 1B, a voltage applied to a windings of one phase is $V/(3)^{1/2}$. In this manner, in the control at the abnormal time, although the motor voltage is the same as the motor voltage in the control at the normal time, the voltage applied to the winding of one phase is reduced to $1/(3)^{1/2}$ compared to that in the normal time. As a result, a problem arises in that the motor output decreases. Further, a motor output (W) is obtained on the basis of the torque (N·m) and rotational speed (rpm).

Hereinafter, example embodiments of a power conversion device, a motor drive unit, and an electric power steering device of the present disclosure will be described in detail with reference to the accompanying drawings. However, description that is more detailed than necessary may be omitted in some cases in order to avoid unnecessary redundancy and to facilitate understanding for those of ordinary skill in the art. For example, detailed description of already well-known matters or a redundant description of substantially the same configuration may be omitted in some cases.

In the present specification, example embodiments of the present disclosure will be described by taking, as an example, a power conversion device which converts power supplied to a three-phase motor including three-phase (U-phase, V-phase, W-phase) windings. However, a power conversion device which converts power supplied to an n-phase motor including windings of n phases (n is an integer of 4 or more) such as four phases or five phases is also within the scope of the present disclosure.

Figure 2:
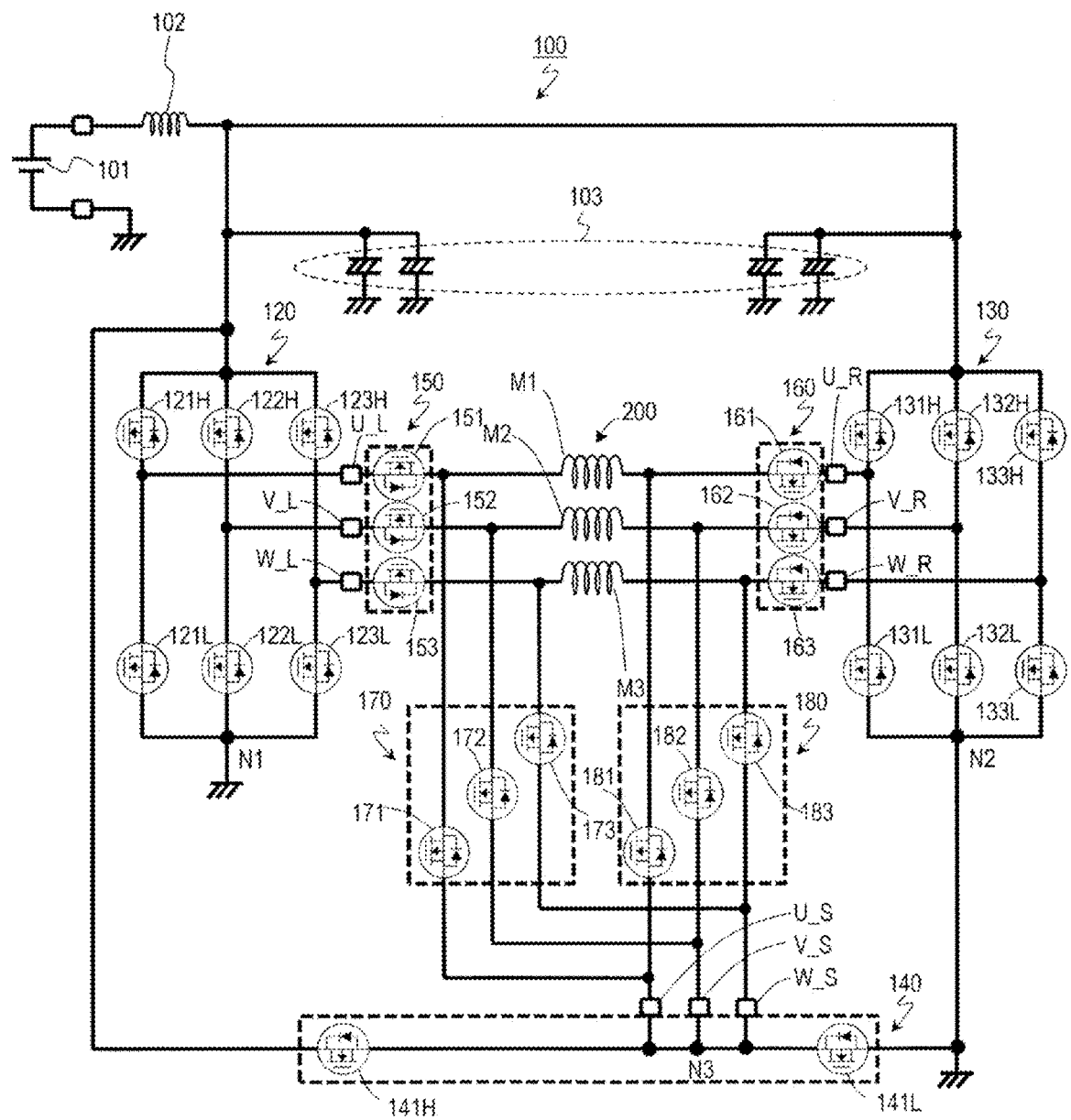
FIG. 2 is a circuit diagram illustrating a circuit configuration of a power conversion device 100 according to a first example embodiment of the present disclosure.

FIG. 2 schematically illustrates a circuit configuration of a power conversion device 100 according to the present example embodiment.

The power conversion device 100 includes first and second inverters 120 and 130, a sub-inverter circuit 140, and first to fourth phase separation relay circuits 150, 160, 170, and 180. The power conversion device 100 is connected to a motor 200 to convert power from a power supply 101 to power supplied to the motor 200 including three-phase windings.

The motor 200 is, for example, a three-phase alternating current (AC) motor. The motor 200 includes a U-phase winding M1, a V-phase winding M2, and a W-phase winding M3 and is connectable to the first inverter 120, the second inverter 130, and the sub-inverter circuit 140. Specifically, the first inverter 120 is connectable to first ends of the windings of each phase of the motor 200, and the second inverter 130 is connectable to the second ends of the windings of each phase. The sub-inverter circuit 140 is connectable to the first ends and the second ends of the windings of each phase. In the present specification, the term "connection" between components (elements) mainly means electrical connection.

The first inverter 120 includes U-phase, V-phase, and W-phase terminals U_L, V_L, and W_L. The second inverter 130 includes U-phase, V-phase, and W-phase terminals U_R, V_R, and W_R. The sub-inverter circuit 140 includes U-phase, V-phase, and W-phase terminals U_S, V_S, and W_S common to the first and second inverters 120 and 130.

The terminal U_L of the first inverter 120 is connected to one end of the U-phase winding M1, the terminal V_L is connected to one end of the V-phase winding M2, and the terminal W_L is connected to one end of the W-phase winding M3. Like the first inverter 120, the terminal U_R of the second inverter 130 is connected to the other end of the winding M1, the terminal V_R is connected to the other end of the winding M2, and the terminal W_R is connected to the other end of the winding M3. Such connections of the motor winding are different from so-called star connections and delta connections.

The terminal U_S of the sub-inverter circuit 140 is connectable to one end or the other end of the U-phase winding M1, the terminal V_S is connectable to one end or the other end of the V-phase winding M2, and the terminal W_S is connectable to one end or the other end of the W-phase winding M3.

The first inverter 120 (referred to as "bridge circuit L" in some cases) includes a bridge circuit formed of three legs. Each leg has a low side switching element and a high side switching element. Switching elements 121L, 122L, and 123L illustrated in FIG. 2 are low side switching elements, and switching elements 121H, 122H, and 123H illustrated in FIG. 2 are high side switching elements. As the switching element, for example, a semiconductor switching element, such as a field-effect transistor (typically, a metal-oxide semiconductor field-effect transistor (MOSFET)) or an insulated gate bipolar transistor (IGBT), may be used. In the present specification, an example in which an FET is used as a switching element of an inverter will be described, and in the following description, a switching element may be referred to as an FET in some cases. For example, the switching element 121L may be referred to as "FET 121L."

The first inverter 120 includes, as a current sensor 190 (see FIG. 4) for detecting a current flowing through the windings M1, M2, and M3 of each phase, a shunt resistor (not illustrated) provided on each leg, for example. The current sensor 190 includes a current detection circuit (not illustrated) that detects a current flowing through the shunt resistor. For example, the shunt resistor is connected between a low side switching element and a node N1 on the ground (GND) side in each leg. A resistance value of the shunt resistor is, for example, in a range of about 0.5 mΩ to 1.0 mΩ.

Like the first inverter 120, the second inverter 130 (referred to as "bridge circuit R" in some cases) includes a bridge circuit formed of three legs. FETs 131L, 132L, and 133L illustrated in FIG. 2 are low side switching elements, and FETs 131H, 132H, and 133H illustrated in FIG. 2 are high side switching elements. Also, like the first inverter 120, each leg of the second inverter 130 includes a shunt resistor (not illustrated). For example, the shunt resistor is connected between a low side switching element and a node N2 on the GND side in each leg. Each FET of the first and second inverters 120 and 130 may be controlled by, for example, a microcontroller or a dedicated driver. Further, the above-described arrangement of the shunt resistors is an example, and the number of shunt resistors used and the arrangement of the shunt resistors are appropriately determined in consideration of product cost, design specifications, or the like.

The sub-inverter circuit 140 according to the present disclosure includes at least one leg. In the present specification, a circuit including at least one leg is referred to as "sub-inverter circuit." The sub-inverter circuit 140 according to the present example embodiment includes a single leg including a high side switching element 141H and a low side switching element 141L. The leg may include a shunt resistor.

The terminals U_S, V_S, and W_S of the sub-inverter circuit 140 are terminals commonly connected to a node N3 between the high side switching element 141H and the low side switching element 141L.

The first phase separation relay circuit 150 includes three first phase separation relays 151, 152, and 153 configured to switch between connection and disconnection between the first ends of the windings of each phase and the first inverter 120. The first phase separation relay circuit 150 is connected between the first ends of the windings of each phase and the first inverter 120. Specifically, the first phase separation relay 151 is connected between the terminal U_L of the first inverter 120 and the one end of the U-phase winding M1. The first phase separation relay 152 is connected between the terminal V_L and the one end of the V-phase winding M2. The first phase separation relay 153 is connected between the terminal W_L and the one end of the W-phase winding M3. The first phase separation relay circuit 150 can, for each phase, switch between connection and disconnection between the first ends of the windings of each phase and the first inverter 120.

The second phase separation relay circuit 160 includes three second phase separation relays 161, 162, and 163 configured to switch between connection and disconnection between the second ends of the windings of each phase and the second inverter 130. The second phase separation relay circuit 160 is connected between the second ends of the windings of each phase and the second inverter 130. Specifically, the second phase separation relay 161 is connected between the terminal U_R of the second inverter 130 and the one end of the U-phase winding M1. The second phase separation relay 162 is connected between the terminal V_R and the other end of the V-phase winding M2. The second phase separation relay 163 is connected between the terminal W_R and the one end of the W-phase winding M3. The second phase separation relay circuit 160 can, for each phase, switch between connection and disconnection between the second ends of the windings of each phase and the second inverter 130.

The third phase separation relay circuit 170 includes three third phase separation relays 171, 172, and 173 configured to switch between connection and disconnection between the first ends of the windings of each phase and the sub-inverter circuit 140. The third phase separation relay circuit 170 is connected between the first ends of the windings of each phase and the sub-inverter circuit 140. Specifically, the third phase separation relay 171 is connected between the terminal U_S of the sub-inverter circuit 140 and the one end of the U-phase winding M1. The third phase separation relay 172 is connected between the terminal V_S and the one end of the V-phase winding M2. The third phase separation relay 173 is connected between the terminal W_S and the one end of the W-phase winding M3. The third phase separation relay circuit 170 can, for each phase, switch between connection and disconnection between the first ends of the windings of each phase and the sub-inverter circuit 140.

The fourth phase separation relay circuit 180 includes three fourth phase separation relays 181, 182, and 183 configured to switch between connection and disconnection between the second ends of the windings of each phase and the sub-inverter circuit 140. The fourth phase separation relay circuit 180 is connected between the second ends of the windings of each phase and the sub-inverter circuit 140. Specifically, the fourth phase separation relay 181 is connected between the terminal U_S of the sub-inverter circuit 140 and the other end of the U-phase winding M1. The fourth phase separation relay 182 is connected between the terminal V_S and the other end of the V-phase winding M2. The fourth phase separation relay 183 is connected between the terminal W_S and the other end of the W-phase winding M3. The fourth phase separation relay circuit 180 can, for each phase, switch between connection and disconnection between the second ends of the windings of each phase and the sub-inverter circuit 140.

Focusing on the first ends of the windings, the first phase separation relay 151 and the third phase separation relay 171 are commonly connected to the one end of the U-phase winding M1, the first phase separation relay 152 and the third phase separation relay 172 are commonly connected to the one end of the V-phase winding M2, and the first phase separation relay 153 and the third phase separation relay 173 are commonly connected to the one end of the W-phase winding M3.

Focusing on the second ends of the windings, the second phase separation relay 161 and the fourth phase separation relay 181 are commonly connected to the other end of the U-phase winding M1, the second phase separation relay 162 and the fourth phase separation relay 182 are commonly connected to the other end of the V-phase winding M2, and the second phase separation relay 163 and the fourth phase separation relay 183 are commonly connected to the other end of the W-phase winding M3.

The on and off of the first phase separation relays 151, 152, and 153, the second phase separation relays 161, 162, and 163, the third phase separation relays 171, 172, and 173, and the fourth phase separation relays 181, 182, and 183 may be controlled by, for example, a microcontroller or a dedicated driver. As the relays, for example, semiconductor switching elements such as FETs or IGBTs may be widely used. Mechanical relays may also be used as the relays. In the present specification, an example in which FETs including a freewheeling diode are used as the relays will be described, and in the following description, each relay will be referred to as "FET." For example, the first phase separation relays 151, 152, and 153 are respectively referred to as FETs 151, 152, and 153.

As an example, in the first phase separation relay circuit 150, the three FETs 151, 152, and 153 may be arranged such that freewheeling diodes are directed in the same direction and a forward current flows in the freewheeling diodes toward the motor 200. In the second phase separation relay circuit 160, the three FETs 161, 162, and 163 may be arranged such that freewheeling diodes are directed in the same direction and a forward current flows in the freewheeling diodes toward the motor 200. In the third phase separation relay circuit 170, the three FETS 171, 172, and 173 may be arranged such that freewheeling diodes are directed in the same direction and a forward current flows in the freewheeling diodes toward the motor 200. In the fourth phase separation relay circuit 180, the three FETS 181, 182, and 183 may be arranged such that freewheeling diodes are directed in the same direction and a forward current flows in the freewheeling diodes toward the motor 200. According to such an arrangement of FETs, a current flowing to the phase separation relay circuit in the off state can be interrupted.

Figure 3:
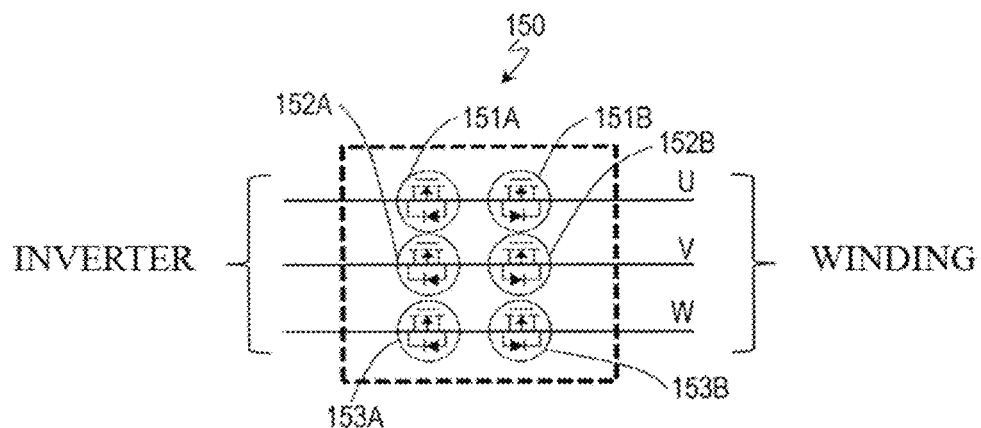
FIG. 3 is a circuit diagram illustrating a circuit configuration of a first phase separation relay circuit 150 according to the first example embodiment of the present disclosure.

FIG. 3 schematically illustrates a circuit configuration of the first phase separation relay circuit 150 including two FETs connected in series for each phase.

As another example, the first phase separation relay circuit 150 may include a plurality of phase separation relays for each phase. As illustrated in FIG. 3, for example, the first phase separation relay circuit 150 may include two FETs connected in series for each phase. Two U-phase FETs 151A and 151B, two V-phase FETs 152A and 152B, and two W-phase FETs 153A and 153B are arranged. Also, the FETs 151A, 152A, and 153A may be arranged such that freewheeling diodes are directed in the same direction and a forward current flows in the freewheeling diodes toward the first inverter 120. On the other end, the FETs 151B, 152B, ad 153B may be arranged such that freewheeling diodes are directed in the same direction, and a forward current flows in the freewheeling diodes toward the motor 200. According to such an arrangement of FETs, the current flowing to the phase separation relay circuit in the off state can be interrupted more reliably.

Like the first phase separation relay circuit 150, the second, third, and fourth phase separation relay circuits 160, 170, and 180 may include a plurality of phase separation relays for each phase. For example, the phase separation relay circuits may include two FETs connected in series for each phase.

The power conversion device 100 is connected to the power supply 101 and the GND. Specifically, each of the first inverter 120, the second inverter 130, and the sub-inverter circuit 140 is connected to the power supply 101 and the GND. Power is supplied from the power supply 101 to the first inverter 120, the second inverter 130, and the sub-inverter circuit 140.

The power supply 101 generates a predetermined source voltage. As the power supply 101, for example, a direct current (DC) power supply is used. However, the power supply 101 may also be an AC-DC converter, a DC-DC converter, or a battery (storage battery). For example, the power supply 101 may be a single power supply common to the first inverter 120, the second inverter 130, and the sub-inverter circuit 140 or may include a first power supply for the first inverter 120 and a second power supply for the second inverter 130.

A coil 102 is provided between the power supply 101 and the power conversion device 100. The coil 102 functions as a noise filter and smoothes high frequency noise included in a waveform of voltage supplied to each inverter or high frequency noise generated in each inverter so that the high frequency noise does not flow out to the power supply 101 side. Also, a condenser 103 is connected to power supply terminals of the first inverter 120, the second inverter 130, and the sub-inverter circuit 140. The condenser 103 is a so-called bypass condenser which suppresses voltage ripple. The condenser 103 is, for example, an electrolytic condenser, and the capacity and number of condensers used are appropriately determined according to design specifications and the like.

Figure 4:
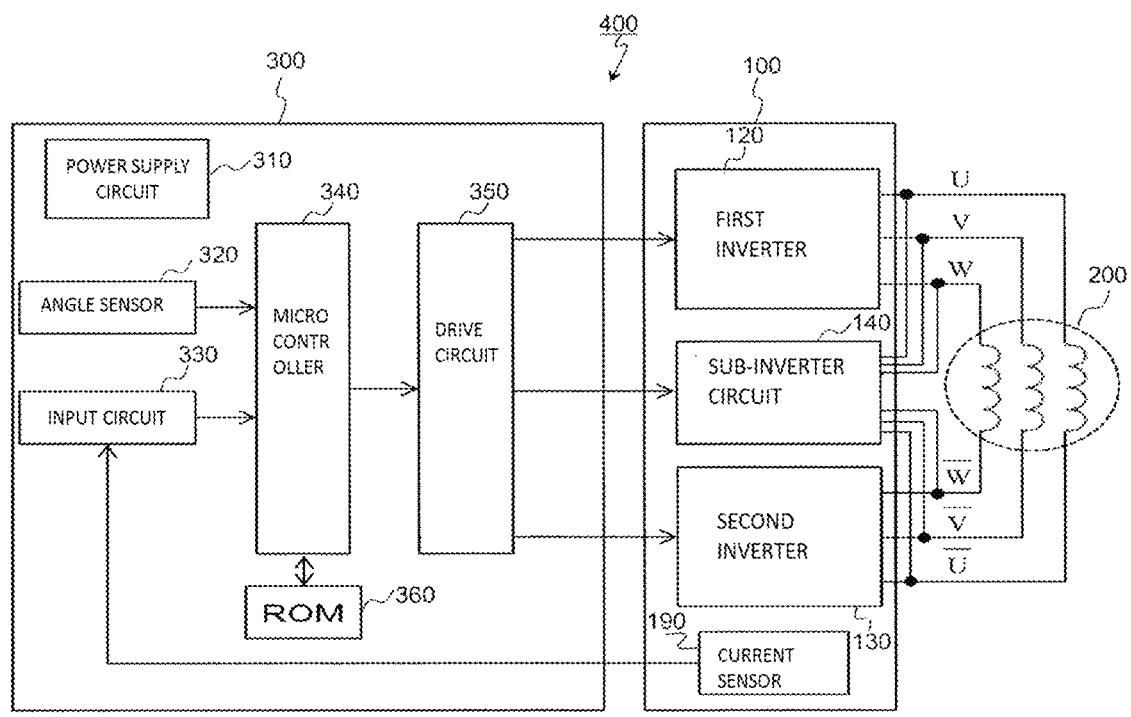
FIG. 4 is a block diagram illustrating a typical block configuration of a motor drive unit 400 including the power conversion device 100.

FIG. 4 schematically illustrates a typical block configuration of a motor drive unit 400 including the power conversion device 100.

The motor drive unit 400 includes the power conversion device 100, the motor 200, and a control circuit 300.

The control circuit 300 includes, for example, a power supply circuit 310, an angle sensor 320, an input circuit 330, a microcontroller 340, a drive circuit 350, and a read only memory (ROM) 360. The control circuit 300 is connected to the power conversion device 100 and controls the power conversion device 100, thereby driving the motor 200. For example, the control circuit 300 can realize closed loop control by controlling the target motor torque or the target rotational speed.

The power supply circuit 310 generates DC voltages (for example, 3 V, 5 V) necessary for each block in the circuit. The angle sensor 320 is, for example, a resolver or a Hall integrated circuit (IC). The angle sensor 320 detects an angle of rotation (hereinafter referred to as "rotation signal") of a rotor of the motor 200 and outputs a rotation signal to the microcontroller 340. The input circuit 330 receives a motor current value (hereinafter referred to as "actual current value") detected by the current sensor 190, converts a level of the actual current value to an input level of the microcontroller 340 as necessary, and outputs the actual current value to the microcontroller 340.

The microcontroller 340 controls a switching operation (turning on or turning off) of each FET in the first inverter 120, the second inverter 130, and the sub-inverter circuit 140 of the power conversion device 100. The microcontroller 340 sets a target current value according to the actual current value, the rotation signal of the rotor, and the like to generate a pulse width modulation (PWM) signal and outputs the PWM signal to the drive circuit 350.

The drive circuit 350 is typically a gate driver. The drive circuit 350 generates, according to the PWM signal, a control signal (gate control signal) for controlling the switching operation of each FET in the first inverter 120, the second inverter 130, and the sub-inverter circuit 140 and assigns the control signal to a gate of each FET. Also, the drive circuit 350 may generate, according to an instruction from the microcontroller 340, a gate control signal for controlling turning on or off of each FET in the first to fourth phase separation relay circuits 150, 160, 170, and 180 and may assign the control signal to a gate of each FET. Further, the microcontroller 340 may have a function of the drive circuit 350. The microcontroller 340 and the drive circuit 350 may be, for example, mounted on the same chip.

The ROM 360 is, for example, a writable memory (e.g., a programmable read-only memory (PROM)), a rewritable memory (e.g., a flash memory), or a read-only memory. The ROM 360 stores a control program including an instruction group for causing the microcontroller 340 to control the power conversion device 100. For example, the control program is deployed temporarily into a random access memory (RAM) (not illustrated) at boot time.

The power conversion device 100 has control at a normal time and an abnormal time. The control circuit 300 (mainly the microcontroller 340) can switch control of the power conversion device 100 from control at the normal time to control at the abnormal time. An on or off state of each FET in the first to fourth phase separation relay circuits 150, 160, 170, and 180 is determined according to the type of control.

The control circuit 300 according to the present example embodiment selectively controls two FETs commonly connected to one end of a winding of each phase and selectively controls two FETs commonly connected to the other end of a winding of each phase. Specifically, the control circuit 300 turns on one of the two FETs 151 and 171 commonly connected to the one end of the U-phase winding M1 and turns off the other. Also, the control circuit 300 turns on one of the two FETs 161 and 181 commonly connected to the other end of the U-phase winding M1 and turns off the other. The control circuit 300 controls the on and off of the remaining FETs connected to the V-phase winding M2 and the W-phase winding M3 in the same manner as the above control.

For example, when the FET 151 is in the on state and the FET 171 is in the off state, the one end of the U-phase winding M1 is connected to the first inverter 120. More specifically, the one end of the U-phase winding M1 is connected to a node between the FETs 121H and 121L in an inverter circuit of the first inverter 120 via the FET 151 and the terminal U_L of the first inverter 120. On the other hand, when the FET 151 is in the off state and the FET 171 is in the on state, the one end of the U-phase winding M1 is connected to the sub-inverter circuit 140. More specifically, the one end of the U-phase winding M1 is connected to the node N3 of the sub-inverter circuit 140 via the FET 171 and the terminal U_S of the sub-inverter circuit 140.

States of connection between the V-phase winding M2 and the first inverter 120, the second inverter 130, and the sub-inverter circuit 140 according to the on and off states of each FET are the same as those of the U-phase winding M1 described above. States of connection between the W-phase winding M3 and the first inverter 120, the second inverter 130, and the sub-inverter circuit 140 according to the on and off states of each FET are also the same as those of the U-phase winding M1 described above.

In the present specification, turning on all the FETs in each phase separation relay circuit is referred to as "turning on the phase separation relay circuit." Also, turning on all the FETs in each phase separation relay circuit is referred to as "turning off the phase separation relay circuit." For example, "turning on the first phase separation relay circuit 150" indicates turning on all of the FETs 151, 152, and 153, and "turning off the first phase separation relay circuit 150" indicates turning off all of the FETs 151, 152, and 153.

A specific example of a control method at a normal time of the power conversion device 100 will be described. As described above, the term "normal" indicates the state in which a failure does not occur in each FET of the first and second inverters 120 and 130.

At the normal time, the control circuit 300 turns on the first and second phase separation relay circuits 150 and 160 and turns off the third and fourth phase separation relay circuits 170 and 180. Consequently, the first ends of the windings of each phase are connected to the first inverter 120, and the second ends thereof are connected to the second inverter 130. The sub-inverter circuit 140 is electrically isolated from the first ends and the second ends of the windings of each phase. In this connection state, the control circuit 300 uses both the first and second inverters 120 and 130 to perform three-phase energization control, thereby driving the motor 200. Specifically, the control circuit 300 performs the three-phase energization control by switching control of the FETs of the first inverter 120 and the FETs of the second inverter 130 in opposite phases (phase difference=180°) from each other. For example, focusing on an H-bridge including the FETs 121L, 121H, 131L, and 131H, when the FET 121L is turned on, the FET 131L is turned off, and when the FET 121L is turned off, the FET 131L is turned on. Likewise, when the FET 121H is turned on, the FET 131H is turned off, and when the FET 121H is turned off, the FET 131H is turned on.

Figure 5:
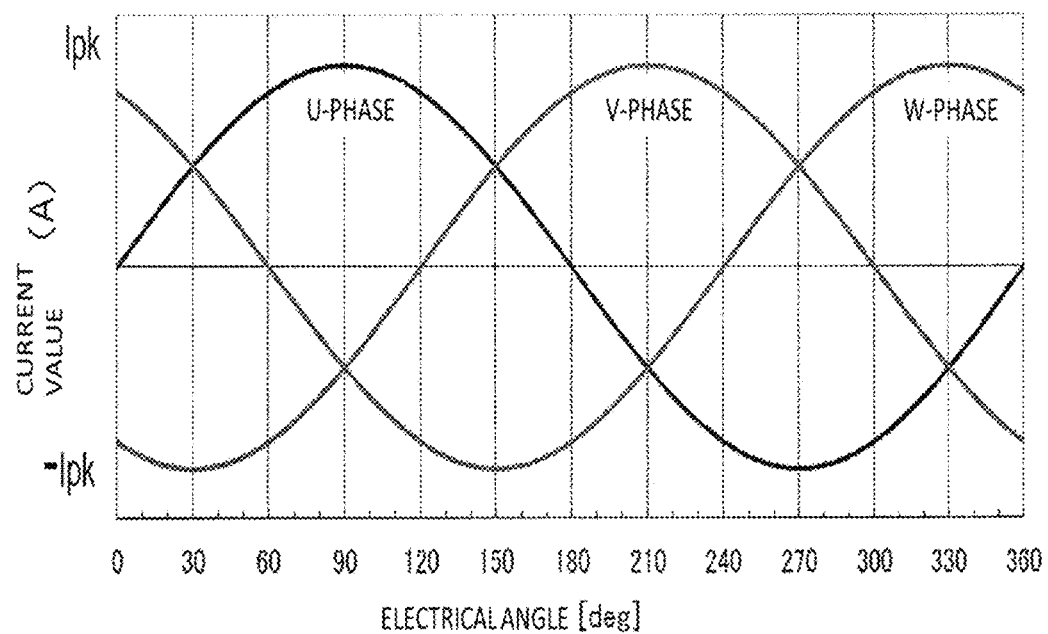
FIG. 5 is a graph showing an example of a current waveform obtained by plotting values of a current flowing through each of U-phase, V-phase, and W-phase windings of a motor 200 when the power conversion device 100 is controlled according to three-phase energization control at a normal time.

FIG. 5 shows an example of a current waveform (sine wave) obtained by plotting values of current flowing through the U-phase, V-phase, and W-phase windings of the motor 200 when the power conversion device 100 is controlled according to the three-phase energization control at the normal time. The horizontal axis indicates the motor electrical angle (deg), and the vertical axis indicates the current value (A). In the current waveform of FIG. 5, current values are plotted every electrical angle of 30°. $I_{pk}$ indicates the maximum current value (peak current value) of each phase. Further, in addition to the sine wave shown as an example in FIG. 5, it is possible to drive the motor 200 using, for example, a rectangular wave.

Table 1 shows values of current flowing to the terminals of each inverter for each electrical angle in the sine wave of FIG. 5. Specifically, Table 1 shows values of current per every electrical angle of 30° flowing to the terminals U_L, V_L, and W_L of the first inverter 120 (bridge circuit L) and values of current per every electrical angle 30° flowing to the terminals U_R, V_R, and W_R of the second inverter 130 (bridge circuit R). Here, for the bridge circuit L, a direction of current flowing from the terminals of the bridge circuit L to the terminals of the bridge circuit R is defined as a positive direction. The direction of current shown in FIG. 5 follows this definition. Also, for the bridge circuit R, a direction of current flowing from the terminals of the bridge circuit R to the terminals of the bridge circuit L is defined as a positive direction. Therefore, the phase difference between the current of the bridge circuit L and the current of the bridge circuit R is 180°. In Table 1, a magnitude of a current value $I_1$ is $[(3)^{1/2}/2]*I_{pk}$, and a magnitude of a current value $I_2$ is $I_{pk}/2$.

circuit L in the V-phase winding M2, and the current having the magnitude $I_2$ flows from the bridge circuit R to the bridge circuit L in the W-phase winding M3.

At the electrical angle of 120°, the current having the magnitude $I_1$ flows from the bridge circuit L to the bridge circuit R in the U-phase winding M1, and the current having the magnitude flows from the bridge circuit R to the bridge circuit L in the W-phase winding M3. No current flows through the V-phase winding M2.

At the electrical angle of 150°, the current having the magnitude $I_2$ flows from the bridge circuit L to the bridge circuit R in the U-phase winding M1, the current having the magnitude $I_2$ flows from the bridge circuit L to the bridge circuit R in the V-phase winding M2, and the current having the magnitude $I_{pk}$ flows from the bridge circuit R to the bridge circuit L in the W-phase winding M3.

At the electrical angle of 180°, no current flows through the U-phase winding M1. The current having the magnitude $I_1$ flows from the bridge circuit L to the bridge circuit R in the V-phase winding M2, and the current having the magnitude $I_1$ flows from the bridge circuit R to the bridge circuit L in the W-phase winding M3.

At the electrical angle of 210°, the current having the magnitude $I_2$ flows from the bridge circuit R to the bridge circuit L in the U-phase winding M1, the current having the magnitude $I_{pk}$ flows from the bridge circuit L to the bridge

TABLE 1

| Operation at normal time | | Electrical angle [deg] | | | | | | | | | | | |
|---|---|---|---|---|---|---|---|---|---|---|---|---|---|
| | | 0 (360) | 30 | 60 | 90 | 120 | 150 | 180 | 210 | 240 | 270 | 300 | 330 |
| Bridge circuit L | U_L phase | 0 | $I_2$ | $I_1$ | $I_{pk}$ | $I_1$ | $I_2$ | 0 | $-I_2$ | $-I_1$ | $-I_{pk}$ | $-I_1$ | $-I_2$ |
| | V_L phase | $-I_1$ | $-I_{pk}$ | $-I_1$ | $-I_2$ | 0 | $I_2$ | $I_1$ | $I_{pk}$ | $I_1$ | $I_2$ | 0 | $-I_2$ |
| | W_L phase | $I_1$ | $I_2$ | 0 | $-I_2$ | $-I_1$ | $-I_{pk}$ | $-I_1$ | $-I_2$ | 0 | $I_2$ | $I_1$ | $I_{pk}$ |
| Bridge circuit R | U_R phase | 0 | $-I_2$ | $-I_1$ | $-I_{pk}$ | $-I_1$ | $-I_2$ | 0 | $I_2$ | $I_1$ | $I_{pk}$ | $I_1$ | $I_2$ |
| | V_R phase | $I_1$ | $I_{pk}$ | $I_1$ | $I_2$ | 0 | $-I_2$ | $-I_1$ | $-I_{pk}$ | $-I_1$ | $-I_2$ | 0 | $I_2$ |
| | W_R phase | $-I_1$ | $-I_2$ | 0 | $I_2$ | $I_1$ | $I_{pk}$ | $I_1$ | $I_2$ | 0 | $-I_2$ | $-I_1$ | $-I_{pk}$ |

At the electrical angle of 0°, no current flows through the U-phase winding M1. A current having a magnitude $I_1$ flows from the bridge circuit R to the bridge circuit L in the V-phase winding M2, and the current having the magnitude $I_1$ flows from the bridge circuit L to the bridge circuit R in the W-phase winding M3.

At the electrical angle of 30°, a current having a magnitude $I_2$ flows from the bridge circuit L to the bridge circuit R in the U-phase winding M1, a current having a magnitude $I_{pk}$ flows from the bridge circuit R to the bridge circuit L in the V-phase winding M2, and the current having the magnitude $I_2$ flows from the bridge circuit L to the bridge circuit R in the W-phase winding M3.

At the electrical angle of 60°, the current having the magnitude $I_1$ flows from the bridge circuit L to the bridge circuit R in the U-phase winding M1, and the current having the magnitude flows from the bridge circuit R to the bridge circuit L in the V-phase winding M2. No current flows through the W-phase winding M3.

At the electrical angle of 90°, the current having the magnitude $I_{pk}$ flows from the bridge circuit L to the bridge circuit R in the U-phase winding M1, the current having the magnitude $I_2$ flows from the bridge circuit R to the bridge circuit R in the V-phase winding M2, and the current having the magnitude $I_2$ flows from the bridge circuit R to the bridge circuit L in the W-phase winding M3.

At the electrical angle of 240°, the current having the magnitude $I_1$ flows from the bridge circuit R to the bridge circuit L in the U-phase winding M1, and the current having the magnitude $I_1$ flows from the bridge circuit L to the bridge circuit R in the V-phase winding M2. No current flows through the W-phase winding M3.

At the electrical angle of 270°, the current having the magnitude $I_{pk}$ flows from the bridge circuit R to the bridge circuit L in the U-phase winding M1, the current having the magnitude $I_2$ flows from the bridge circuit L to the bridge circuit R in the V-phase winding M2, and the current having the magnitude $I_2$ flows from the bridge circuit L to the bridge circuit R in the W-phase winding M3.

At the electrical angle of 300°, the current having the magnitude $I_1$ flows from the bridge circuit R to the bridge circuit L in the U-phase winding M1, and the current having the magnitude $I_1$ flows from the bridge circuit L to the bridge circuit R in the W-phase winding M3. No current flows through the V-phase winding M2.

At the electrical angle of 330°, the current having the magnitude $I_2$ flows from the bridge circuit R to the bridge circuit L in the U-phase winding M1, the current having the magnitude $I_2$ flows from the bridge circuit R to the bridge circuit L in the V-phase winding M2, and the current having the magnitude $I_{pk}$ flows from the bridge circuit L to the bridge circuit R in the W-phase winding M3.

According to the three-phase energization control according to the present example embodiment, the sum of the currents flowing through the three-phase windings in consideration of the direction of the current is always "0" for each electrical angle. For example, the control circuit 300 controls the switching operation of each FET of the bridge circuits L and R by PWM control by which the current waveform shown in FIG. 5 is obtained.

A specific example of a control method at an abnormal time of the power conversion device 100 will be described. There are two major types of FET failure: "open failure" and "short failure." "Open failure" refers to a failure in which a portion between a source and a drain of an FET is open (in other words, resistance rds between the source and the drain becomes high impedance), and "short failure" refers to a failure in which the short circuit occurs between the source and the drain of the FET.

Referring back to FIG. 2, when the power conversion device 100 is operating normally, it is usually considered that a random failure occurs in which one FET randomly fails out of the twelve FETs in the two inverters. The present disclosure mainly provides a control method of the power conversion device 100 in the case in which a random failure occurs. However, the present disclosure also provides a control method of the power conversion device 100 in the case in which a plurality of FETs fail in a chain manner. A chain failure means, for example, a failure that occurs simultaneously in a high side switching element and a low side switching element of a single leg.

When the power conversion device 100 is used for a long time, a random failure may occur. Further, the random failure is different from a manufacture failure that may occur at the time of manufacturing. When even one of the plurality of FETs in the two inverters fails, it is not possible to continue driving the motor by the three-phase energization control at the normal time.

As an example of failure detection, the drive circuit 350 detects a failure of an FET by monitoring a voltage (Vds) between a drain and a source of the FET and comparing the Vds with a predetermined threshold voltage. The threshold voltage is set in the drive circuit 350, for example, by data communication with an external IC (not illustrated) and an external component. The drive circuit 350 is connected to a port of the microcontroller 340 and notifies the microcontroller 340 of a failure detection signal. For example, when the drive circuit 350 detects a failure of an FET, the drive circuit 350 asserts a failure detection signal. When the microcontroller 340 receives the asserted failure detection signal, the microcontroller 340 reads internal data of the drive circuit 350 to determine which of the plurality of FETs in the two inverters has failed.

As another example of failure detection, the microcontroller 340 can also detect a failure of an FET on the basis of a difference between an actual current value and a target current value of a motor. However, failure detection is not limited to these methods, and other known methods related to failure detection can be widely used.

When a failure detection signal is asserted, the microcontroller 340 switches the control of the power conversion device 100 from the control at the normal time to the control at the abnormal time. For example, a timing at which the control of the power conversion device 100 is switched from the control at the normal time to the control at the abnormal time is about 10 msec to 30 msec after the failure detection signal is asserted.

Hereinafter, control of the power conversion device 100 in a case in which a failure of an FET has occurred in the bridge circuit R of the first inverter 120 will be described. Of course, a description which is the same as the following description is established in a case in which a failure of an FET has occurred in the bridge circuit L of the second inverter 130.

Among the three FETs FET 151, 152, and 153 in the first phase separation relay circuit 150, the control circuit 300 turns off an FET connected to a leg (of the bridge circuit R) including a failed FET and turns on the other switching elements, and among the three FETs 171, 172, and 173 in the third phase separation relay circuit 170, the control circuit 300 turns on an FET commonly connected to one end of a winding with the FET turned off in the first phase separation relay circuit 150 and turns off the other switching elements. The control circuit 300 also turns on the second phase separation relay circuit 160 and turns off the fourth phase separation relay circuit 180. According to this control, a leg (node N3) of the sub-inverter circuit 140 is electrically connectable to one of six of the first ends and the second ends of the windings M1 to M3.

In the present specification, control in a case in which the high side switching element (FET) 121H has failed in the bridge circuit R of the first inverter 120 is exemplified. Further, even in a case in which the other FETs 122H, 123H, 121L, 122L, and 123L have failed, the control of the power conversion device 100 can be switched to the control at the abnormal time on the basis of a process shown below.

Among the FETs 151, 152, and 153 in the first phase separation relay circuit 150, the control circuit 300 turns off the FET 151 connected to a leg (of the bridge circuit R) including the failed FET 121H and turns on the other FETs 152 and 153, and among the FETs 171, 172, and 173 in the third phase separation relay circuit 170, the control circuit 300 turns on the FET 171 commonly connected to the one end of the winding M1 with the FET 151 turned off in the first phase separation relay circuit 150 and turns off the other FETs 172 and 173. The control circuit 300 also turns on the second phase separation relay circuit 160 and turns off the fourth phase separation relay circuit 180. According to this example, a leg of the sub-inverter circuit 140 is connected to the one end of the winding M1.

According to the above-described control, the leg including the failed FET 121H is electrically isolated from the one end of the winding M1, and in place of the leg including the failed FET 121H, the leg of the sub-inverter circuit 140 is connected to the one end of the winding M1. In this manner, it becomes possible to substitute the leg including the failed FET 121H in the bridge circuit R with the leg of the sub-inverter circuit 140.

The one end of the winding M1 is connected to the leg of the sub-inverter circuit 140, the first ends of the windings M2 and M3 are respectively connected to the remaining legs of the first inverter 120, and the second ends of the windings M1, M2, and M3 are connected to the second inverter 130. It becomes possible to continue the three-phase energization control as in the normal time by using the two legs of the first inverter 120 other than the leg thereof including the failed FET 121H, the second inverter 130, and the leg of the sub-inverter circuit 140.

In the case in which a failure of an FET has occurred in the bridge circuit L of the second inverter 130, as in the control at the time of failure in the first inverter 120, it becomes possible to substitute a leg including the failed FET in the bridge circuit L with a leg of the sub-inverter circuit 140 by turning on or off each FET in the first to fourth phase separation relay circuits 150, 160, 170, and 180. As a result, it becomes possible to continue performing the three-phase energization control.

Further, even at the normal time, it becomes possible to perform the three-phase energization control by substituting a single leg in the bridge circuit R or L with a leg of the sub-inverter circuit 140.

According to the present example embodiment, it is possible to continue performing the three-phase energization control even when the control of the power conversion device 100 is switched from the control at the normal time to the control at the abnormal time. As a result, motor output which is the same as that at the normal time can be obtained in the control at the abnormal time.

Figure 6:
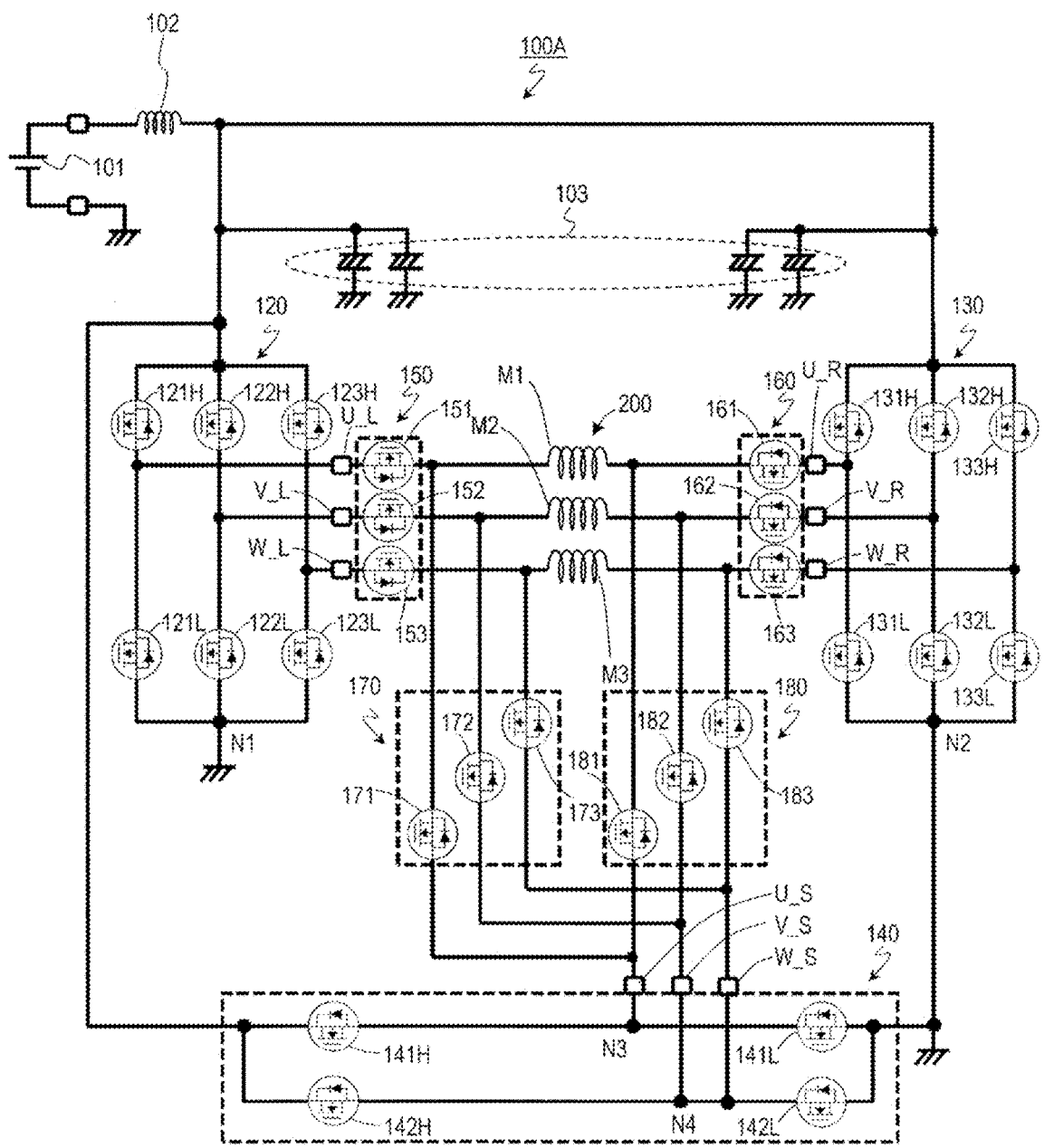
FIG. 6 is a circuit diagram illustrating a circuit configuration of a power conversion device 100A according to a modified example of the first example embodiment of the present disclosure.

FIG. 6 schematically illustrates a circuit configuration of a power conversion device 100A according to a modified example of the present example embodiment.

In the power conversion device 100A, the sub-inverter circuit 140 includes two legs. At least one of the first ends of the windings of each phase is connected to a node between a low side switching element and a high side switching element in one of the two legs of the sub-inverter circuit 140 via the third phase separation relay circuit 170, and the remaining first ends of the windings of each phase are connected to a node between a low side switching elements and a high side switching element in the other one of the two legs of the sub-inverter circuit 140 via the third phase separation relay circuit 170.

In the power conversion device 100A, at least one of the second ends of the windings of each phase is connected to a node in one leg of the sub-inverter circuit 140 via the fourth phase separation relay circuit 180, and the remaining second ends of the windings of each phase are connected to a node in the other leg of the sub-inverter circuit 140 via the fourth phase separation relay circuit 180.

In this manner, the one end of each winding may be connected to any one of the two legs of the sub-inverter circuit 140. Likewise, the other end of each winding may be connected to any one of the two legs of the sub-inverter circuit 140. FIG. 6 exemplifies a configuration in which both ends of the winding M1 are connected to one leg of the sub-inverter circuit 140 and both ends of the windings M2 and M3 are connected to the other leg of the sub-inverter circuit 140. However, of course, the connection between the two legs of the sub-inverter circuit 140 and the both ends of each winding is not limited thereto, and any other selectable combination is possible.

For example, it is assumed that the FET 121H of the first inverter 120 and the FET 132H of the second inverter 130 have failed simultaneously. In that case, the control circuit 300 may, in the first phase separation relay circuit 150, turn off the FET 151 connected to the leg (of the bridge circuit R) including the failed FET 121H and turn on the FETs 152 and 153 and, in the third phase separation relay circuit 170, turn on the FET 171 and turn off the FETs 172 and 173.

The control circuit 300 may also, in the second phase separation relay circuit 160, turn off the FET 162 connected to the leg (of the bridge circuit L) including the failed FET 132H and turn on the FETs 161 and 163 and, in the fourth phase separation relay circuit 180, turn on the FET 182 and turn off the FETs 181 and 183. According to this example, the node N3 of one leg of the sub-inverter circuit 140 is connected to the one end of the winding M1, and a node N4 of the other leg of the sub-inverter circuit 140 is connected to the other end of the winding M2.

According to the present modified example, it is possible to continue performing the three-phase energization control by substituting a single leg in the bridge circuit R or L with any one of the two legs of the sub-inverter circuit 140. Furthermore, in a case in which there are two legs including a failed FET, it is possible to continue performing the three-phase energization control by substituting the legs with the two legs of the sub-inverter circuit 140.

Figure 7:
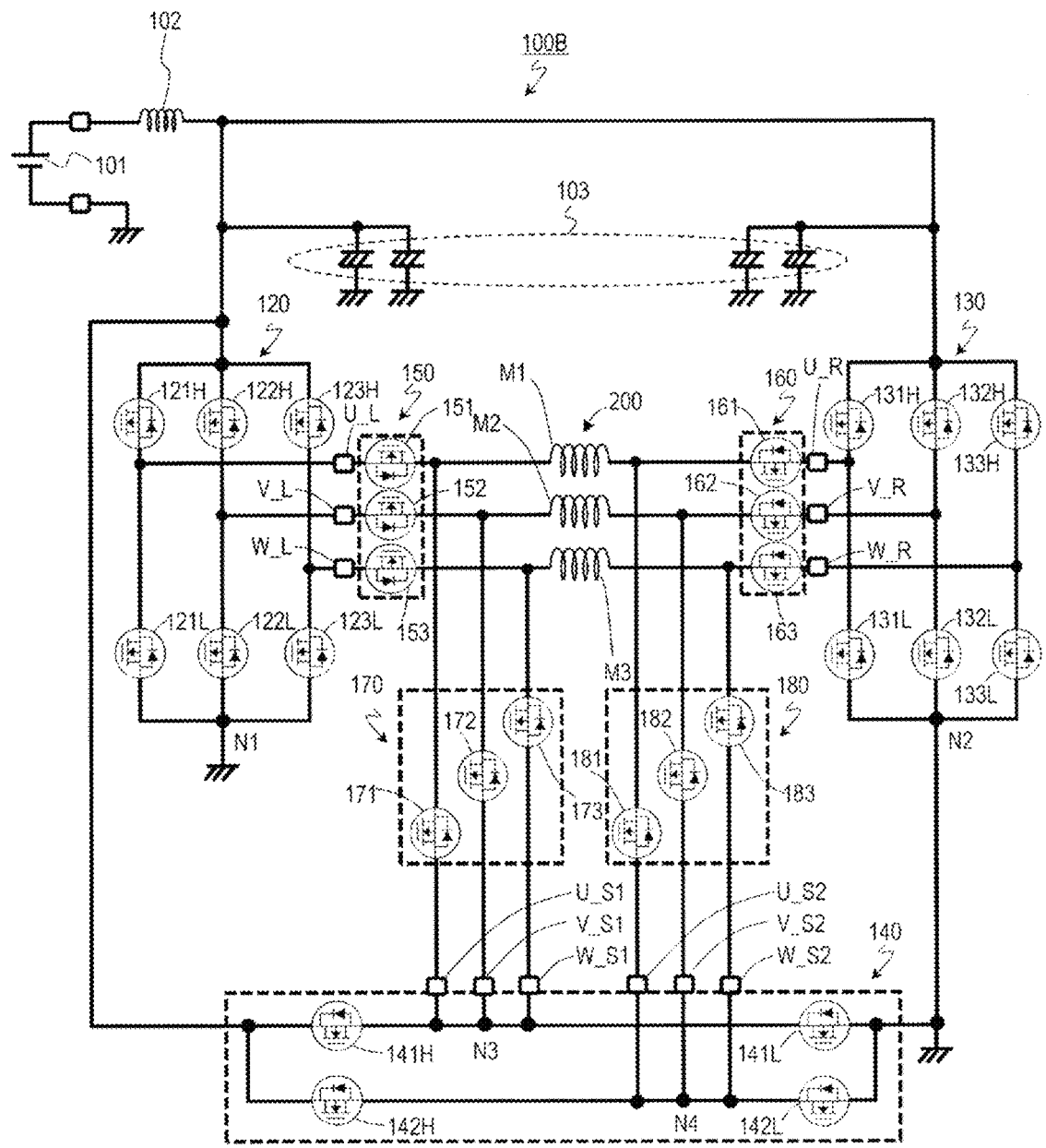
FIG. 7 is a circuit diagram illustrating a circuit configuration of a power conversion device 100B according to a further modified example of the first example embodiment of the present disclosure.

FIG. 7 schematically illustrates a circuit configuration of a power conversion device 100B according to a further modified example of the present example embodiment.

In the power conversion device 100B, the sub-inverter circuit 140 includes a leg for the first inverter and a leg for the second inverter. The first ends of the windings of each phase are connected to a node N3 in the leg for the first inverter of the sub-inverter circuit 140 via the third phase separation relay circuit 170, and the second ends of the windings of each phase are connected to a node N4 in the leg for the second inverter of the sub-inverter circuit 140 via the fourth phase separation relay circuit 180.

According to the present modified example, it becomes possible to substitute a single leg of the bridge circuit R with the leg for the first inverter of the sub-inverter circuit 140 and to substitute a single leg of the bridge circuit L with the leg for the second inverter of the sub-inverter circuit 140. Particularly, in a case in which a leg including a failed FET is present in each of the first and second inverters 120 and 130, it is possible to continue performing the three-phase energization control.

A power conversion device 100C according to the present example embodiment is different from the power conversion device 100 according to the first example embodiment in that the sub-inverter circuit 140 includes three legs. Hereinafter, differences from the first example embodiment will be mainly described.

Figure 8:
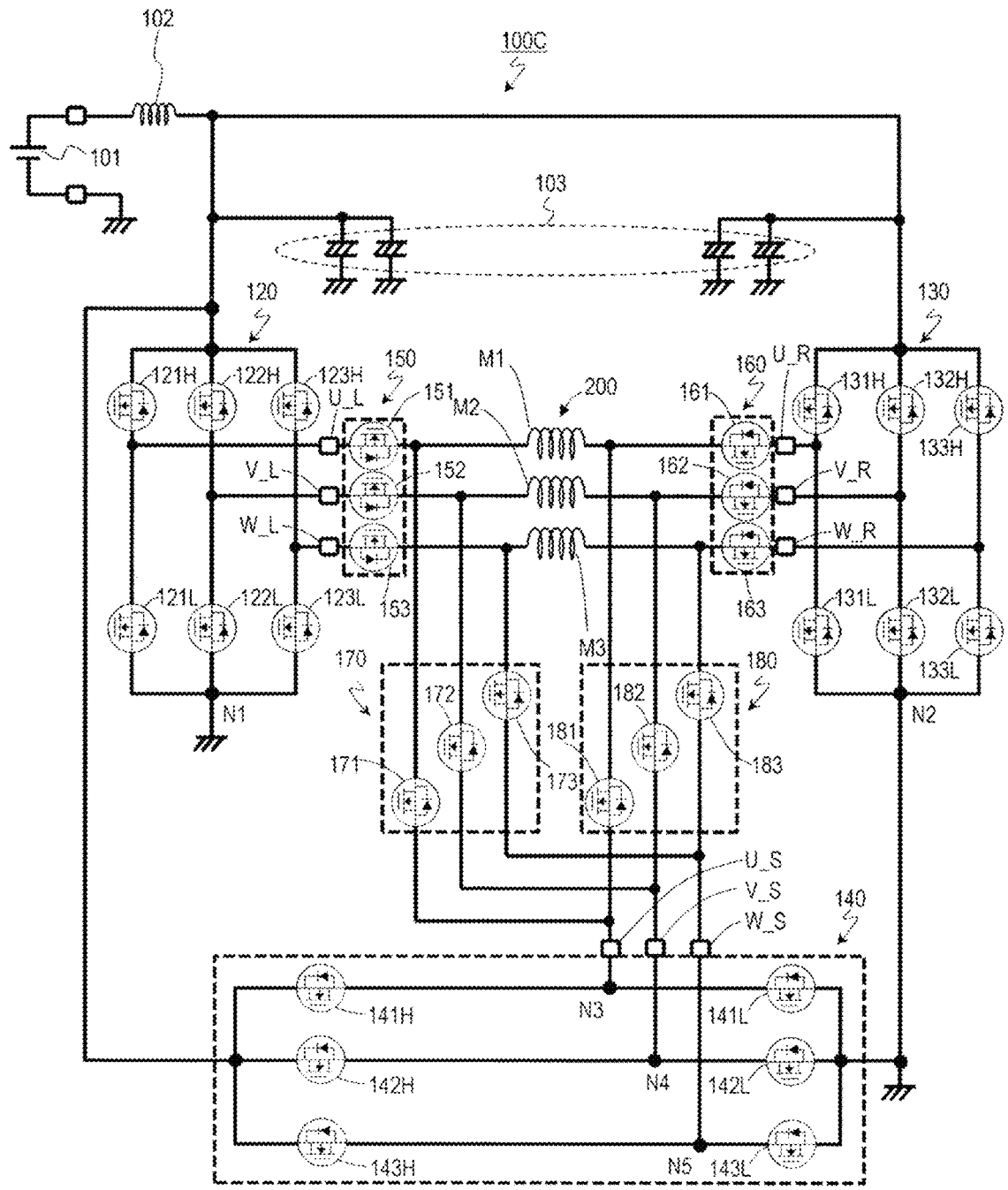
FIG. 8 is a circuit diagram illustrating a circuit configuration of a power conversion device 100C according to a second example embodiment of the present disclosure.

FIG. 8 schematically illustrates a circuit configuration of the power conversion device 100C according to the present example embodiment.

In the power conversion device 100C, the sub-inverter circuit 140 includes three legs. A terminal U_S of the sub-inverter circuit 140 is connected to a node N3 between an FET 141H and an FET 141L, a terminal V_S of the sub-inverter circuit 140 is connected to a node N4 between an FET 142H and an FET 142L, and a terminal W_S of the sub-inverter circuit 140 is connected to a node N5 between an FET 143H and an FET 143L.

First ends of windings of each phase are connected to each of the three terminals U_S, V_S, and W_S of the sub-inverter circuit 140 via a third phase separation relay circuit 170. The second ends of the windings of each phase are connected to each of the three terminals U_S, V_S, and W_S of the sub-inverter circuit 140 via a fourth phase separation relay circuit 180.

Control at a normal time and an abnormal time is the three-phase energization control described above in the first example embodiment. Because the sub-inverter circuit 140 according to the present example embodiment includes three legs, the sub-inverter circuit 140 may be referred to as "inverter" like the first and second inverters 120 and 130. That is, the power conversion device 100C includes first to third inverters. According to this configuration, in a case in which one of the two inverters has failed, the three-phase energization control can be continued using the inverter which has not failed and the sub-inverter circuit 140.

For example, when the first inverter 120 is abnormal, the control circuit 300 may turn off the first phase separation relay circuit 150, turn on the second phase separation relay circuit 160, turn on the third phase separation relay circuit 170, and turn off the fourth phase separation relay circuit 180. Consequently, the failed inverter can be separated from the motor 200, and the three-phase energization control can be continued using the second inverter 130 and the sub-inverter circuit 140. When the second inverter 130 is abnormal, like the control described above, the three-phase energization control can be continued using the first inverter 120 and the sub-inverter circuit 140.

Further, in the circuit configuration according to the present example embodiment, as in the first example embodiment, each FET of the phase separation relay circuits may be turned on or off for each phase. For example, in a case in which the FET 121H of the bridge circuit R has failed, the control circuit 300 may, in the first phase separation relay circuit 150, turn off the FET 151 and turn on the FETs 152 and 153 and, in the third phase separation relay circuit 170, turn on the FET 171 and turn off the FETs 172 and 173. In other words, it is possible to continue performing the three-phase energization control at the abnormal time by using at least one of the three legs of the sub-inverter circuit 140.

According to the present example embodiment, for example, even in a case in which all the high side switching elements in the bridge circuit R of the first inverter 120 have failed, it is possible to continue performing the three-phase energization control by substituting the entire bridge circuit R with the sub-inverter circuit 140.

A power conversion device 100D according to the present example embodiment is different from the power conversion device 100 according to the first example embodiment in that, in the power conversion device 100D, two phase separation relay circuits are included on only the first inverter 120 side of the motor 200.

Figure 9:
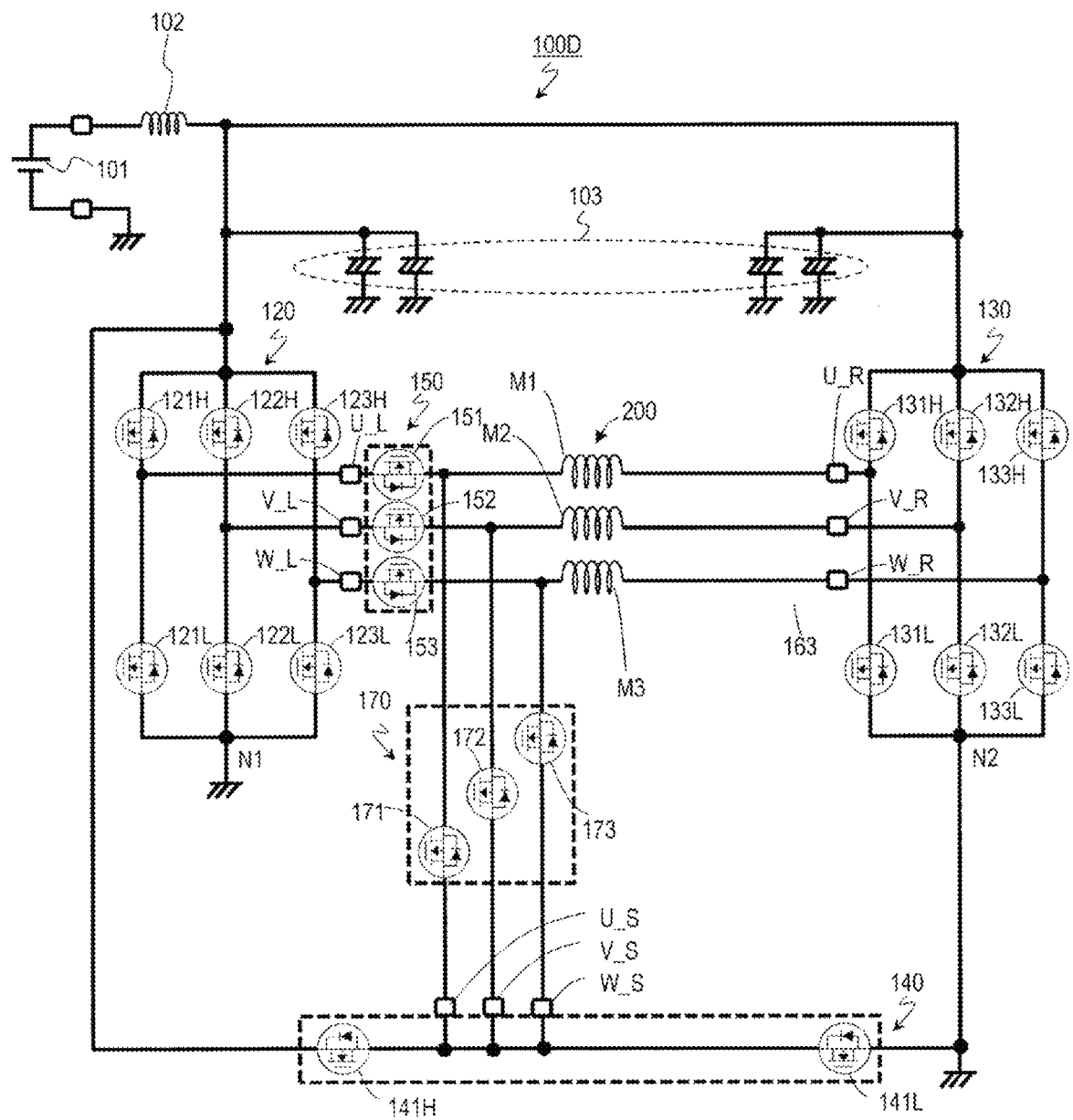
FIG. 9 is a circuit diagram illustrating a circuit configuration of a power conversion device 100D according to a third example embodiment of the present disclosure.

FIG. 9 schematically illustrates a circuit configuration of the power conversion device 100D according to the present example embodiment.

In the power conversion device 100D, two phase separation relay circuits 150 and 170 are included on only the first inverter 120 side of the motor 200, that is, on only one side of the motor 200.

According to the present example embodiment, when the first inverter 120, that is, one of the two inverters 120 in which the two phase separation relay circuits are provided, fails, it is possible to continue performing the three-phase energization control using the sub-inverter circuit 140.

Generally, vehicles such as automobiles have an electric power steering device. The electric power steering device generates auxiliary torque for assisting steering torque of a steering system that is generated by a driver operating a steering wheel. The auxiliary torque is generated by an auxiliary torque mechanism and can reduce the burden on an operation of the driver. For example, the auxiliary torque mechanism is configured by a steering torque sensor, an electronic control unit (ECU), a motor, a deceleration mechanism, and the like. The steering torque sensor detects steering torque in a steering system. The ECU generates a drive signal on the basis of a detection signal of the steering torque sensor. The motor generates auxiliary torque according to the steering torque on the basis of the drive signal and transmits the auxiliary torque to the steering system through the deceleration mechanism.

Figure 10:
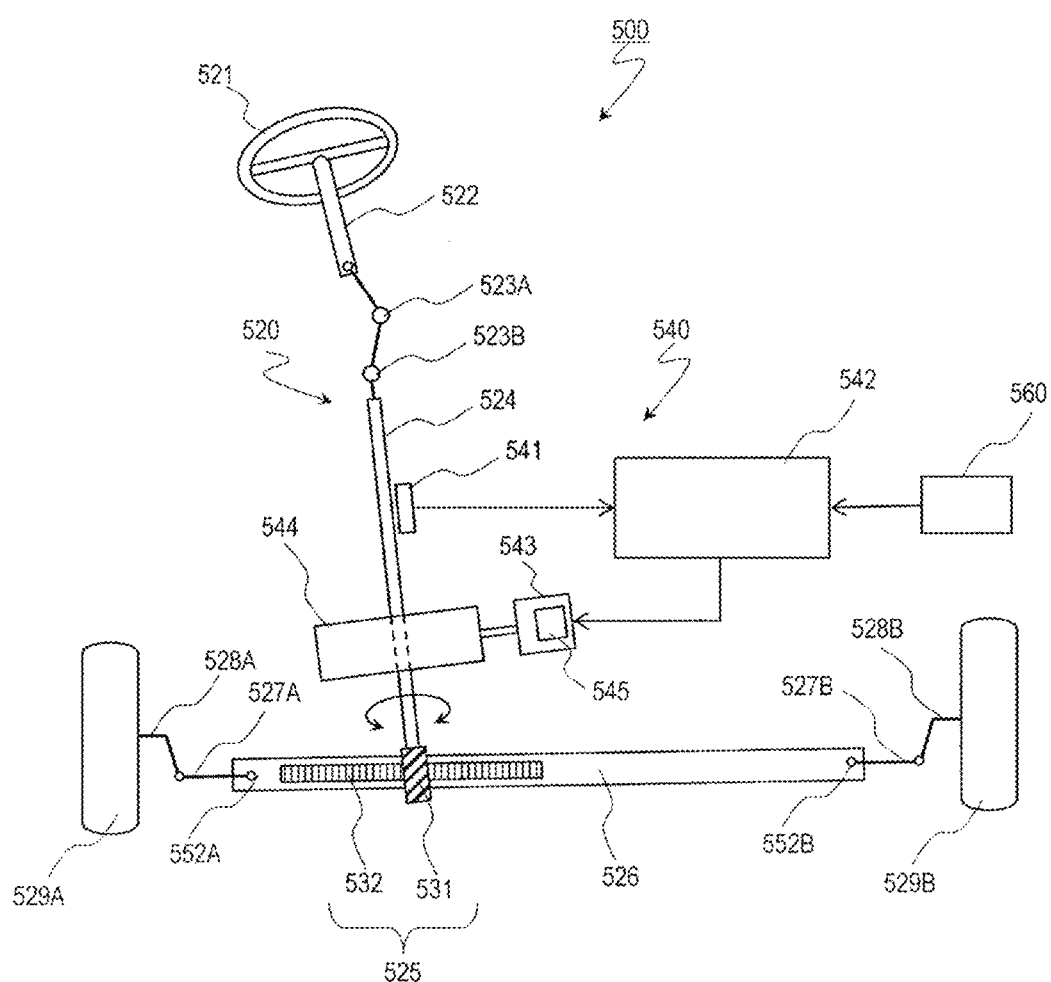
FIG. 10 is a schematic diagram illustrating a typical configuration of an electric power steering device 500 according to a fourth example embodiment of the present disclosure.

The motor drive unit 400 of the present disclosure is suitably used for an electric power steering device. FIG. 10 schematically illustrates a typical configuration of an electric power steering device 500 according to the present example embodiment. The electric power steering device 500 includes a steering system 520 and an auxiliary torque mechanism 540.

The steering system 520 may be configured by, for example, a steering wheel 521, a steering shaft 522 (also referred to as "steering column"), universal couplings 523A and 523B, a rotation shaft 524 (also referred to as "pinion shaft" or "input shaft"), a rack and pinion mechanism 525, a rack shaft 526, left and right ball joints 552A and 552B, tie rods 527A and 527B, knuckles 528A and 528B, and left and right steering vehicle wheels (for example, left and right front wheels) 529A and 529B. The steering wheel 521 is connected to the rotation shaft 524 through the steering shaft 522 and the universal couplings 523A and 523B. The rack shaft 526 is connected to the rotation shaft 524 through the rack and pinion mechanism 525. The rack and pinion mechanism 525 has a pinion 531 provided at the rotation shaft 524 and a rack 532 provided at the rack shaft 526. The steering vehicle wheel 529A at a right side is connected to a right end of the rack shaft 526 while the ball joint 552A, the tie rod 527A, and the knuckle 528A are interposed in that order therebetween. Like the right side, the steering vehicle wheel 529B at a left side is connected to a left end of the rack shaft 526 while the ball joint 552B, the tie rod 527B, and the knuckle 528B are interposed in that order therebetween. Here, the right side and the left side respectively correspond to a right side and a left side as seen by the driver sitting on the driver's seat.

According to the steering system 520, by the driver operating the steering wheel 521, the auxiliary torque is generated and transmitted to the left and right steering vehicle wheels 529A and 529B through the rack and pinion mechanism 525. Consequently, the driver can operate the left and right steering vehicle wheels 529A and 529B.

The auxiliary torque mechanism 540 may be configured by, for example, a steering torque sensor 541, an ECU 542, a motor 543, a deceleration mechanism 544, and a power conversion device 545. The auxiliary torque mechanism 540 assigns auxiliary torque to the steering system 520 ranging from the steering wheel 521 to the left and right steering vehicle wheels 529A and 529B. Further, the auxiliary torque is referred to as "additional torque" in some cases.

The control circuit 300 according to the present disclosure may be used as the ECU 542, and the power conversion device 100 according to the present disclosure may be used as the power conversion device 545. Also, the motor 543 corresponds to the motor 200 according to the present disclosure. The motor drive unit 400 according to the present disclosure may be suitably used for a mechanically and electrically integrated motor that is capable of being configured by the ECU 542, the motor 543, and the power conversion device 545.

The steering torque sensor 541 detects the steering torque of the steering system 520 assigned by the steering wheel 521. The ECU 542 generates a drive signal for driving the motor 543 on the basis of a detection signal (hereinafter referred to as "torque signal") from the steering torque sensor 541. The motor 543 generates auxiliary torque according to the steering torque on the basis of the drive signal. The auxiliary torque is transmitted to the rotation shaft 524 of the steering system 520 through the deceleration mechanism 544. The deceleration mechanism 544 is, for example, a worm gear mechanism. The auxiliary torque is also transmitted from the rotation shaft 524 to the rack and pinion mechanism 525.

The electric power steering device 500 may be classified into a pinion assist type, a rack assist type, a column assist type, and the like by a site where the auxiliary torque is assigned to the steering system 520. FIG. 10 illustrates the electric power steering device 500 of the pinion assist type. However, the electric power steering device 500 may also be applied as the rack assist type, the column assist type, and the like.

Not only the torque signal but also, for example, a vehicle speed signal may be input to the ECU 542. An external device 560 is, for example, a vehicle speed sensor. Alternatively, the external device 560 may also be another ECU capable of communicating in an in-vehicle network such as a controller area network (CAN). A microcontroller of the ECU 542 can perform vector control or PWM control on the motor 543 on the basis of the torque signal, the vehicle speed signal, or the like.

The ECU 542 sets a target current value on the basis of at least the torque signal. It is desirable that the ECU 542 set the target current value by taking into consideration the vehicle speed signal detected by the vehicle speed sensor and a rotation signal of a rotor detected by an angle sensor. The ECU 542 may control a drive signal, that is, a drive current, of the motor 543 so that an actual current value detected by a current sensor (not illustrated) corresponds to the target current value.

According to the electric power steering device 500, the left and right steering vehicle wheels 529A and 529B can be operated by the rack shaft 526 using combined torque obtained by adding the auxiliary torque of the motor 543 to the steering torque of the driver. Particularly, by using the motor drive unit 400 of the present disclosure in the above-described mechanically and electrically integrated unit, there is provided an electric power steering device including a motor drive unit in which quality of components is improved and motor output can be maintained even when motor control is switched from control at a normal time to control at an abnormal time.

According to example embodiments of the present disclosure, there is provided a power conversion device capable of maintaining motor output even when motor control is switched from control at a normal time to control at an abnormal time, a motor drive unit including the power conversion device, and an electric power steering device including the motor drive unit.

According to example embodiments of the present disclosure, there is provided a power conversion device capable of maintaining motor output even when motor control is switched from control at a normal time to control at an abnormal time, a motor drive unit including the power conversion device, and an electric power steering device including the motor drive unit.

The example embodiments of the present disclosure can be widely used in various devices including various motors, such as a vacuum cleaner, a dryer, a ceiling fan, a washing machine, a refrigerator, and an electric power steering device.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A power conversion device that converts power from a power supply to power supplied to a motor having n-phase windings where n is an integer of 3 or more, the power conversion device comprising:
   a first inverter connected to first ends of the windings of each phase of the motor;
   a second inverter connected to second ends of the windings of each phase;
   a first phase separation relay circuit to switch between connection and disconnection between the first ends of the windings of each phase and the first inverter;
   a second phase separation relay circuit to switch between connection and disconnection between the second ends of the windings of each phase and the second inverter;
   a sub-inverter circuit connectable to the first ends and the second ends of the windings of each phase;
   a third phase separation relay circuit to switch between connection and disconnection between the first ends of the windings of each phase and the sub-inverter circuit; and
   a fourth phase separation relay circuit to switch between connection and disconnection between the second ends of the windings of each phase and the sub-inverter circuit.

2. The power conversion device according to claim 1, wherein:
   the first phase separation relay circuit includes n switching elements to switch between connection and disconnection between the first ends of the windings of each phase and the first inverter;
   the second phase separation relay circuit includes n switching elements to switch between connection and disconnection between the second ends of the windings of each phase and the second inverter;
   the third phase separation relay circuit includes n switching elements to switch between connection and disconnection between the first ends of the windings of each phase and the sub-inverter circuit; and
   the fourth phase separation relay circuit includes n switching elements to switch between connection and disconnection between the second ends of the windings of each phase and the sub-inverter circuit.

3. The power conversion device according to claim 2, wherein each of the n switching elements in each of the first, second, third and fourth phase separation relay circuits is a semiconductor switching element including a freewheeling diodes, and n freewheeling diodes in each circuit are directed in a same direction.

4. The power conversion device according to claim 3, wherein each of the n switching elements in each of the first, second, third, and fourth phase separation relay circuits are arranged such that a forward current flows in the freewheeling diodes toward the motor.

5. The power conversion device according to claim 1, wherein:
   bridge circuits of the first and second inverters each include n legs each including a low side switching element and a high side switching element;
   the sub-inverter circuit includes a single leg including a low side switching element and a high side switching element;
   the first ends of the windings of each phase are connected to n nodes between the low side switching element and the high side switching element in the bridge circuit of the first inverter via the first phase separation relay circuit and are connected to a node between the low side switching element and the high side switching element in the leg of the sub-inverter circuit via the third phase separation relay circuit; and the second ends of the windings of each phase are connected to n nodes between the low side switching element and the high side switching element in the bridge circuit of the second inverter via the second phase separation relay circuit and are connected to a node between the low side switching element and the high side switching element in the leg of the sub-inverter circuit via the fourth phase separation relay circuit.

6. The power conversion device according to claim 1, wherein:

bridge circuits of the first and second inverters each include n legs each including a low side switching element and a high side switching element;

the sub-inverter circuit includes two legs each including a low side switching element and a high side switching element;

the first ends of the windings of each phase are connected to n nodes between the low side switching element and the high side switching element in the bridge circuit of the first inverter via the first phase separation relay circuit;

at least one of the first ends of the windings of each phase is connected to a node between the low side switching element and the high side switching element in one of the two legs of the sub-inverter circuit via the third phase separation relay circuit, and the remaining first ends of the windings of each phase are connected to a node between the low side switching element and the high side switching element in the other one of the two legs of the sub-inverter circuit via the third phase separation relay circuit;

the second ends of the windings of each phase are connected to n nodes between the low side switching element and the high side switching element in the bridge circuit of the second inverter via the second phase separation relay circuit; and at least one of the second ends of the windings of each phase is connected to the node in the one leg of the sub-inverter circuit via the fourth phase separation relay circuit, and the remaining second ends of the windings of each phase are connected to the node in the other leg of the sub-inverter circuit via the fourth phase separation relay circuit.

7. The power conversion device according to claim 1, wherein:

bridge circuits of the first and second inverters each include n legs each including a low side switching element and a high side switching element;

the sub-inverter circuit includes a leg for the first inverter, the leg including a low side switching element and a high side switching element, and a leg for the second inverter, the leg including a low side switching element and a high side switching element;

the first ends of the windings of each phase are connected to n nodes between the low side switching element and the high side switching element in the bridge circuit of the first inverter via the first phase separation relay circuit and are connected to a node between the low side switching element and the high side switching element in the leg for the first inverter of the sub-inverter circuit via the third phase separation relay circuit; and the second ends of the windings of each phase are connected to n nodes between the low side switching element and the high side switching element in the bridge circuit of the second inverter via the second phase separation relay circuit and are connected to a node between the low side switching element and the high side switching element in the leg for the second inverter of the sub-inverter circuit via the fourth phase separation relay circuit.

8. The power conversion device according to claim 1, wherein:

bridge circuits of the first and second inverters each include n legs each including a low side switching element and a high side switching element;

the sub-inverter circuit includes n legs each including a low side switching element and a high side switching element;

the first ends of the windings of each phase are connected to n nodes between the low side switching element and the high side switching element in the bridge circuit of the first inverter via the first phase separation relay circuit and are connected to n nodes between the low side switching element and the high side switching element in the sub-inverter circuit via the third phase separation relay circuit; and the second ends of the windings of each phase are connected to n nodes between the low side switching element and the high side switching element in the bridge circuit of the second inverter via the second phase separation relay circuit and are connected to n nodes between the low side switching element and the high side switching element in the sub-inverter circuit via the fourth phase separation relay circuit.

9. The power conversion device according to claim 1, wherein, during a normal operation, the first and second phase separation relay circuits are turned on and the third and fourth phase separation relay circuits are turned off.

10. The power conversion device according to claim 8, wherein, when the first inverter is abnormal, the first phase separation relay circuit is turned off, the second phase separation relay circuit is turned on, the third phase separation relay circuit is turned on, and the fourth phase separation relay circuit is turned off.

11. The power conversion device according to claim 8, wherein, when the second inverter is abnormal, the first phase separation relay circuit is turned on, the second phase separation relay circuit is turned off, the third phase separation relay circuit is turned off, and the fourth phase separation relay circuit is turned on.

12. The power conversion device according to claim 10, wherein power conversion is performed using an inverter among the first and second inverters that has not failed and the sub-inverter circuit.

13. The power conversion device according to claim 5, wherein, in a case in which the bridge circuit of the first inverter includes a failed switching element:

in the first phase separation relay circuit, among the n switching elements, a switching element connected to a leg including the failed switching element is turned off and the other (n−1) switching elements are turned on;

the second phase separation relay circuit is turned on;

in the third phase separation relay circuit, among the n switching elements, a switching element commonly connected to one end of a winding with the switching element turned off in the first phase separation relay circuit is turned on, and the other (n−1) switching elements are turned off; and the fourth phase separation relay circuit is turned off.

14. The power conversion device according to claim 5, wherein, in a case in which the bridge circuit of the second inverter includes a failed switching element:

the first phase separation relay circuit is turned on;

in the second phase separation relay circuit, among the n switching elements, a switching element connected to a leg including the failed switching element is turned off, and the other (n−1) switching elements are turned on;

the third phase separation relay circuit is turned off; and in the fourth phase separation relay circuit, among the n switching elements, a switching element commonly connected to the other end of a winding with the switching element turned off in the second phase separation relay circuit is turned on, and the other (n−1) switching elements are turned off.

15. The power conversion device according to claim 13, wherein, by substituting the leg including the failed switching element in the bridge circuit of the first inverter with a leg of the sub-inverter circuit, power conversion is performed using the first and second inverters and the sub-inverter circuit.

16. The power conversion device according to claim 14, wherein, by substituting the leg including the failed switching element in the bridge circuit of the second inverter with a leg of the sub-inverter circuit, power conversion is performed using the first and second inverters and the sub-inverter circuit.

17. The power conversion device according to claim 1, wherein the power supply is a single power supply.

18. A motor drive unit comprising:

the power conversion device according to claim 1; and a control circuit to control the power conversion device.

19. An electric power steering device comprising the motor drive unit according to claim 18.

* * * * *